(12) United States Patent
Mizuno

(10) Patent No.: US 9,349,351 B2
(45) Date of Patent: May 24, 2016

(54) IMAGE PROCESSING APPARATUS AND METHOD UTILIZING HIGH AND LOW FREQUENCY COMPONENT IMAGES

(71) Applicant: CANON KABUSHIKI KAISHA, Tokyo (JP)

(72) Inventor: Ryosuke Mizuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 13/916,785

(22) Filed: Jun. 13, 2013

(65) Prior Publication Data

US 2014/0002500 A1 Jan. 2, 2014

(30) Foreign Application Priority Data

Jun. 27, 2012 (JP) ................................. 2012-144587

(51) Int. Cl.
*G06T 11/00* (2006.01)
*G09G 5/377* (2006.01)
*G09G 3/20* (2006.01)
*G09G 3/36* (2006.01)
*H04N 7/01* (2006.01)
*G09G 5/395* (2006.01)

(52) U.S. Cl.
CPC .............. *G09G 5/377* (2013.01); *G09G 3/2092* (2013.01); *G09G 3/3611* (2013.01); *G09G 5/395* (2013.01); *G09G 2320/0257* (2013.01); *G09G 2320/0261* (2013.01); *G09G 2340/0435* (2013.01); *H04N 7/0142* (2013.01)

(58) Field of Classification Search
None
See application file for complete search history.

(56) References Cited

U.S. PATENT DOCUMENTS

| 8,311,392 B2 | 11/2012 | Mizuno |
| 8,487,919 B2 | 7/2013 | Kobayashi |
| 8,913,876 B2 | 12/2014 | Mizuno |
| 2009/0040374 A1* | 2/2009 | Kobayashi ................... 348/448 |
| 2009/0073192 A1 | 3/2009 | Kobayashi |
| 2010/0303374 A1* | 12/2010 | Mizuno ........................ 382/260 |
| 2011/0170009 A1* | 7/2011 | Uemura et al. ............... 348/598 |

FOREIGN PATENT DOCUMENTS

| CN | 101365052 A | 2/2009 |
| CN | 101902561 A | 12/2010 |
| JP | 2008-064919 A | 3/2008 |
| JP | 2009-042481 A | 2/2009 |

OTHER PUBLICATIONS

Feb. 2, 2016 Chinese Office Action corresponding to Chinese Patent Application No. 201310253343.4.

* cited by examiner

*Primary Examiner* — Phi Hoang
*Assistant Examiner* — Diane Wills
(74) *Attorney, Agent, or Firm* — Fitzpatrick, Cella, Harper & Scinto

(57) ABSTRACT

Each frame image is acquired as an input image. An image obtained by emphasizing high frequency components in the input image is generated as a high frequency component emphasized image, a composite image is generated by compositing the input image and an input image of a previous frame before the input image, and an image including low frequency components in the composite image is generated as a low frequency component image. Then, the high frequency component emphasized image and low frequency component image are alternately output as images of sub-frames of the input image.

13 Claims, 9 Drawing Sheets

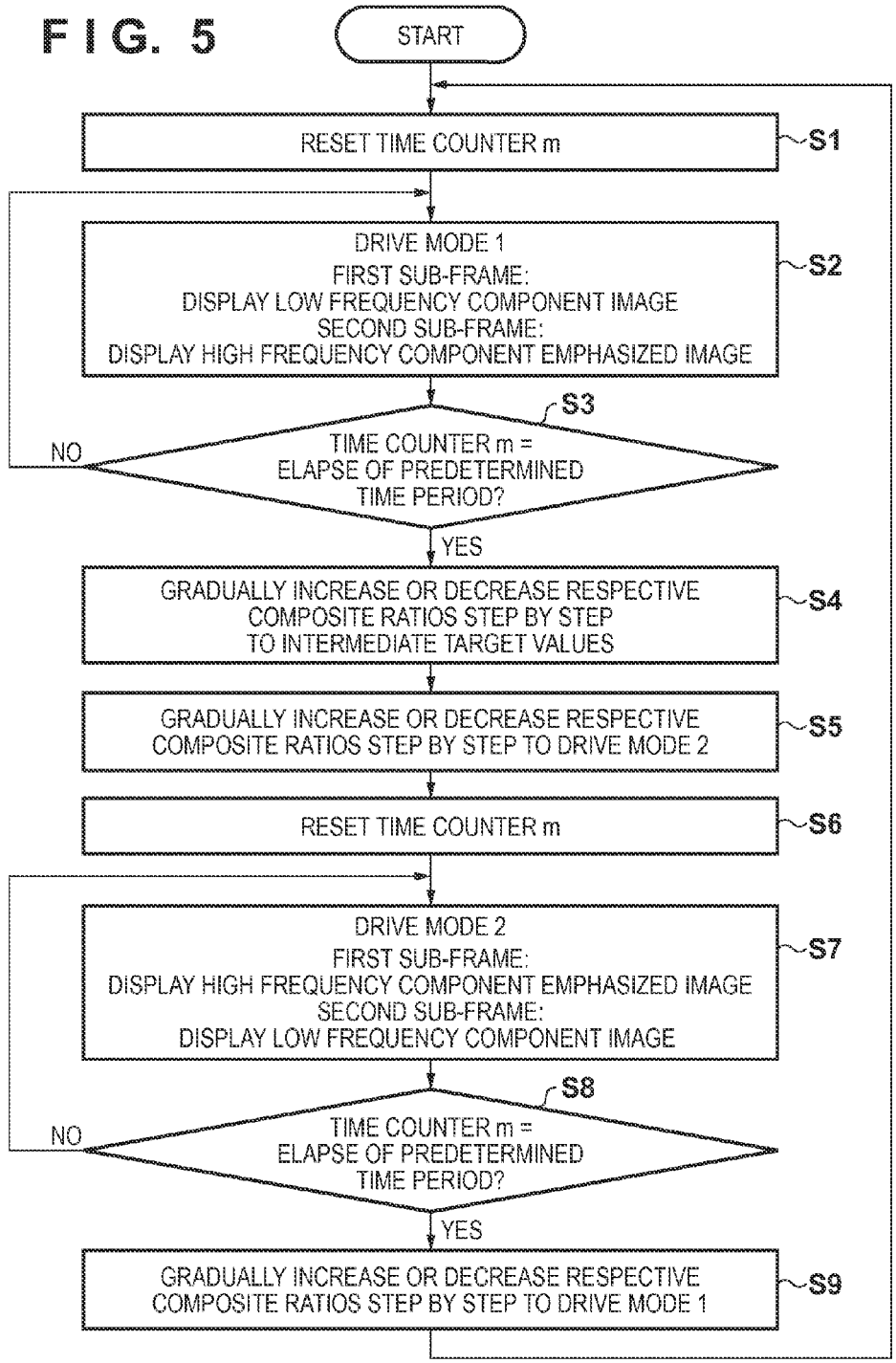

IMAGE PROCESSING APPARATUS AND METHOD UTILIZING HIGH AND LOW FREQUENCY COMPONENT IMAGES

BACKGROUND OF THE INVENTION

1. Field of the Invention

The present invention relates to a technique for displaying an image.

2. Description of the Related Art

In recent years, image display devices such as a TV receiver and PC monitor which include various display devices (for example, a liquid crystal display device) have been put into practical use. In general, in a liquid crystal display device, so-called "burn-in", which cannot reproduce tone characteristics due to a charge bias, occurs when a DC voltage is kept applied between pixel and counter electrodes for a long period of time.

For this reason, the liquid crystal display device is driven as follows. That is, for example, an input image signal having a frame rate of 60 Hz is doubled to 120 Hz to define sub-frames, so as not to cause any charge bias. Then, the polarity of a signal voltage to be applied to liquid crystal for each sub-frame is periodically inverted with respect to a common electrode voltage (VCOM). In this case, a driving operation for inverting the polarity of a signal voltage to be applied to a liquid crystal for each sub-frame is called a sub-frame inversion AC driving operation.

On the other hand, in a hold type display device represented by a liquid crystal display device, when a following view of a moving object is made (a way of viewing a moving object while being followed by a line of sight in movie display), a motion blur according to a light output period is observed. As a technique for suppressing such motion blur, a "spatial frequency separation method" has been proposed. The "spatial frequency separation method" is a display method which concentrates spatial high frequency components involved in a motion blur on one sub-frame and reduces them in the other sub-frame. Thus, since spatial high frequency components are locally included in one sub-frame in an output image, a motion blur can be suppressed.

However, in the "spatial frequency separation method", since different voltages are applied between sub-frames, an applied voltage is biased to one polarity, and burn-in is generated upon driving for a long period of time. For this reason, a technique for further suppressing a motion blur by reducing an increase in charge accumulated amount by correcting a driving waveform in the "spatial frequency separation method" according to an accumulated value of differences between sub-frames, that is, a charge accumulated amount has been disclosed (patent literature 1 (Japanese Patent Laid-Open No. 2009-042481)). Also, a technique for preventing an applied voltage from being biased by extending a polarity inversion driving period from a sub-frame unit to a frame unit has been disclosed (patent literature 2 (Japanese Patent Laid-Open No. 2008-064919)).

With the technique disclosed in patent literature 1, since an accumulated value of differences between sub-frames is stored, a charge accumulated amount can be estimated with high precision, while a frame memory is required. Hence, it is difficult to implement this technique in a system in which a memory band is limited.

The method of extending the polarity inversion period disclosed in patent literature 2 suffers a problem that flicker is readily viewed due to a long polarity inversion period. Since the "spatial frequency separation method" temporally divides spatial frequency components and displays them on respective sub-frames, in movie display with a quick motion, low frequency components are temporally shifted with respect to high frequency components due to their display time difference, and are often viewed as a tailing phenomenon.

SUMMARY OF THE INVENTION

The present invention has been made in consideration of the aforementioned problems, and provides a technique for suppressing a motion blur by the "spatial frequency separation method", and eliminating a tailing phenomenon caused by a display time difference of respective frequency components. Furthermore, the present invention suppresses image quality deterioration such as burn-in caused by a charge bias upon application of the "spatial frequency separation method".

According to the first aspect of the present invention, an image processing apparatus comprising: an acquisition unit configured to acquire each frame image as an input image; a first generation unit configured to generate an image obtained by emphasizing high frequency components in the input image as a high frequency component emphasized image; a second generation unit configured to generate a composite image by compositing the input image and an input image of a previous frame before the input image, and to generate an image including low frequency components in the composite image as a low frequency component image; and an output unit configured to alternately output the high frequency component emphasized image and the low frequency component image as images of sub-frames of the input image.

According to the second aspect of the present invention, an image processing apparatus comprising: an acquisition unit configured to acquire each frame image as an input image; a first composition unit configured to generate a first composite image by compositing the input image and a previous input image as an input image of a previous frame before the input image at a first composition ratio and to generate a second composite image by compositing the input image and the previous input image at a second composite ratio; a first generation unit configured to generate an image obtained by emphasizing high frequency components in the first composite image as a high frequency component emphasized image; a second generation unit configured to generate an image including low frequency components in the second composite image as a low frequency component image; a second composition unit configured to generate a third composite image by compositing the high frequency component emphasized image and the low frequency component image at a third composite ratio and to generate a fourth composite image by compositing the high frequency component emphasized image and the low frequency component image at a fourth composite ratio; an output unit configured to alternately output the third composite image and the fourth composite image as sub-frame images of the input image; and an adjustment unit configured to adjust the first composite ratio, the second composite ratio, the third composite ratio, and the fourth composite ratio for respective frames.

According to the third aspect of the present invention, an image processing apparatus comprising: an acquisition unit configured to acquire each frame image as an input image; a generation unit configured to generate images of a plurality of sub-frames with respect to the input image; and a unit configured to output the sub-frame images, wherein the generation unit comprises: a first composition unit configured to generate a first composite image by compositing the input image and a previous input image as an input image of a previous frame before the input image at a first composite ratio adjusted for a sub-frame of interest; a first generation unit configured to generate an image obtained by emphasizing high frequency components in the first composite image as a high frequency component emphasized image; a second generation unit configured to generate an image including low frequency components in the first composite image as a low frequency component image; a second composition unit configured to generate, as an image of the sub-frame of interest, a second composite image by compositing the high frequency component emphasized image and the low frequency component image at a second composite ratio adjusted for the sub-frame of interest; and an adjustment unit configured to adjust the first composite ratio and the second composite ratio for each sub-frame.

According to the fourth aspect of the present invention, an image processing apparatus comprising: an acquisition unit configured to acquire each frame image as an input image; a generation unit configured to generate images of a plurality of sub-frames with respect to the input image; and a unit configured to output the sub-frame images, wherein the generation unit comprises: a unit configured to generate an interpolation image at a frame position between the input image and an input image of a previous frame before the input image; a first generation unit configured to generate an image obtained by emphasizing high frequency components in the interpolation image as a high frequency component emphasized image; a second generation unit configured to generate an image including low frequency components in the interpolation image as a low frequency component image; a unit configured to generate, as an image of the sub-frame, a composite image by compositing the high frequency component emphasized image and the low frequency component image at a set composite ratio; and an adjustment unit configured to adjust the frame position and the composite ratio for each sub-frame.

According to the fifth aspect of the present invention, an image processing method executed by an image processing apparatus, comprising: an acquisition step of acquiring each frame image as an input image; a first generation step of generating an image obtained by emphasizing high frequency components in the input image as a high frequency component emphasized image; a second generation step of generating a composite image by compositing the input image and an input image of a previous frame before the input image, and generating an image including low frequency components in the composite image as a low frequency component image; and an output step of alternately outputting the high frequency component emphasized image and the low frequency component image as images of sub-frames of the input image.

According to the sixth aspect of the present invention, an image processing method executed by an image processing apparatus, comprising: an acquisition step of acquiring each frame image as an input image; a first composition step of generating a first composite image by compositing the input image and a previous input image as an input image of a previous frame before the input image at a first composition ratio, and generating a second composite image by compositing the input image and the previous input image at a second composite ratio; a first generation step of generating an image obtained by emphasizing high frequency components in the first composite image as a high frequency component emphasized image; a second generation step of generating an image including low frequency components in the second composite image as a low frequency component image; a second composition step of generating a third composite image by compositing the high frequency component emphasized image and the low frequency component image at a third composite ratio, and generating a fourth composite image by compositing the high frequency component emphasized image and the low frequency component image at a fourth composite ratio; an output step of alternately outputting the third composite image and the fourth composite image as sub-frame images of the input image; and an adjustment step of adjusting the first composite ratio, the second composite ratio, the third composite ratio, and the fourth composite ratio for respective frames.

According to the seventh aspect of the present invention, an image processing method executed by an image processing apparatus, comprising: an acquisition step of acquiring each frame image as an input image; a generation step of generating images of a plurality of sub-frames with respect to the input image; and a step of outputting the sub-frame images, wherein the generation step comprises: a first composition step of generating a first composite image by compositing the input image and a previous input image as an input image of a previous frame before the input image at a first composite ratio adjusted for a sub-frame of interest; a first generation step of generating an image obtained by emphasizing high frequency components in the first composite image as a high frequency component emphasized image; a second generation step of generating an image including low frequency components in the first composite image as a low frequency component image; a second composition step of generating, as an image of the sub-frame of interest, a second composite image by compositing the high frequency component emphasized image and the low frequency component image at a second composite ratio adjusted for the sub-frame of interest; and an adjustment step of adjusting the first composite ratio and the second composite ratio for each sub-frame.

According to the eighth aspect of the present invention, an image processing method executed by an image processing apparatus, comprising: an acquisition step of acquiring each frame image as an input image; a generation step of generating images of a plurality of sub-frames with respect to the input image; and a step of outputting the sub-frame images, wherein the generation step comprises: a step of generating an interpolation image at a frame position between the input image and an input image of a previous frame before the input image; a first generation step of generating an image obtained by emphasizing high frequency components in the interpolation image as a high frequency component emphasized image; a second generation step of generating an image including low frequency components in the interpolation image as a low frequency component image; a step of generating, as an image of the sub-frame, a composite image by compositing the high frequency component emphasized image and the low frequency component image at a set composite ratio; and an adjustment step of adjusting the frame position and the composite ratio for each sub-frame.

Further features of the present invention will become apparent from the following description of exemplary embodiments with reference to the attached drawings.

BRIEF DESCRIPTION OF THE DRAWINGS

FIG. 5 is a flowchart of processing executed by the image processing apparatus;

DESCRIPTION OF THE EMBODIMENTS

An embodiment of the present invention will be described hereinafter with reference to the accompanying drawings. Note that an embodiment to be described hereinafter is an example when the present invention is carried out practically, and is one of practical embodiments of the arrangement defined in the scope of the claims.

First Embodiment

Figure 1:
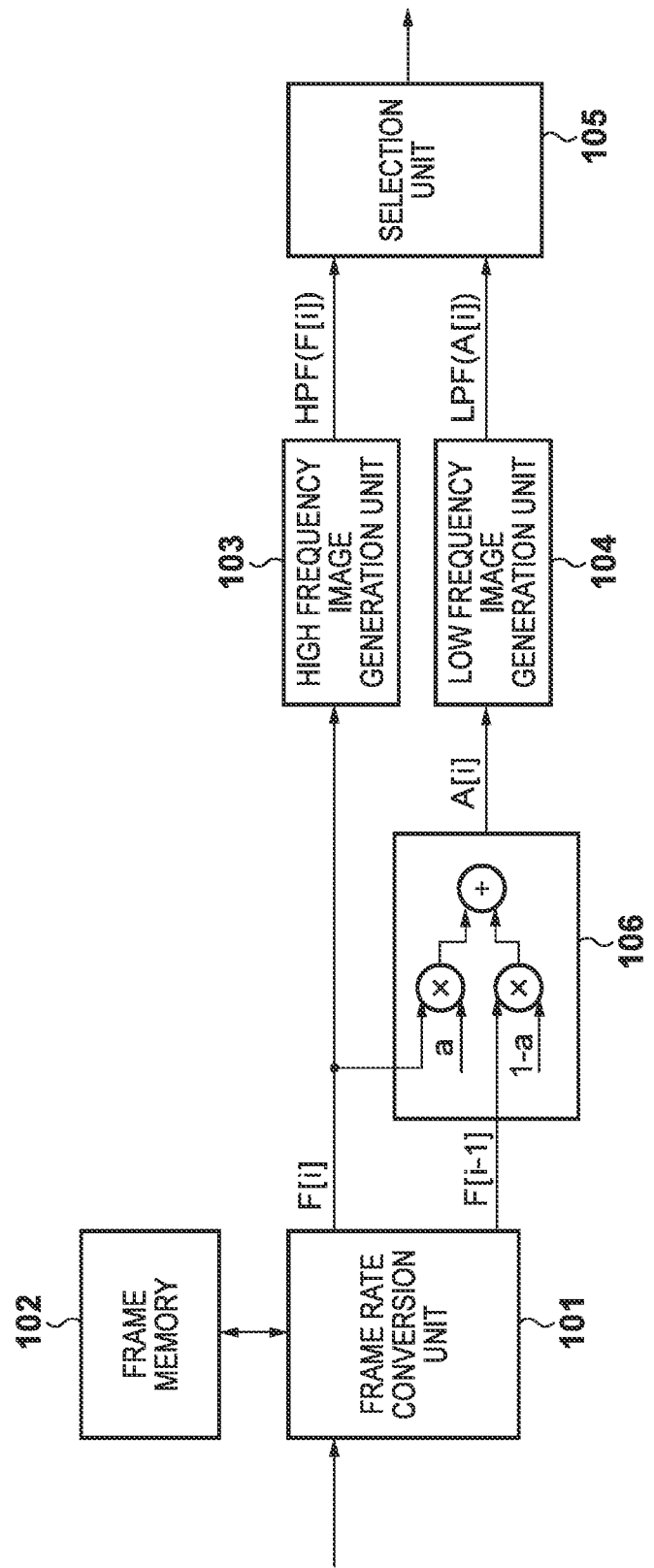
FIG. 1 is a block diagram showing an example of the functional arrangement of an image processing apparatus.

An image processing apparatus according to this embodiment decomposes an input image of each frame into two sub-frame images, and outputs two sub-frame images during a one-frame period, thus obtaining an output frame rate twice of an input frame rate. Then, in this case, in the "spatial frequency separation method", high-frequency components involved in a motion blur are locally included in one sub-frame, thus suppressing the motion blur. On the other hand, since spatial frequency components are temporally divided and are displayed on respective sub-frames, in movie display with a quick motion, low frequency components are temporally shifted and viewed with respect to high frequency components. In this case, a viewing phenomenon of temporally shifted low frequency components will be referred to as a tailing phenomenon hereinafter. In this embodiment, in order to eliminate a tailing phenomenon viewed due to a temporal barycenter shift in display, a low frequency component image is generated after images are composited between frames. An example of the functional arrangement of the image processing apparatus according to this embodiment will be described first with reference to the block diagram shown in FIG. 1.

To a frame rate conversion unit 101, images of respective frames which form a movie are sequentially input. The frame rate conversion unit 101 acquires an input image of each frame as an input image, stores the acquired input image in a frame memory 102, and reads out the input image at a rate twice of an input frame rate from the frame memory 102.

A case will be explained below wherein the frame rate conversion unit 101 reads out an i-th frame image $F[i]$ and $(i-1)$-th frame image $F[i-1]$. In this case, $F[i]$ indicates an i-th input image to the frame rate conversion unit 101 (i-th frame image). Therefore, when respective processes to be described below are executed for i=2, 3, . . . , sub-frame images of respective frames can be generated and output.

Then, the frame rate conversion unit 101 outputs the image $F[i]$ to a high frequency image generation unit 103 and first image composition unit 106, and outputs the image $F[i-1]$ to the first image composition unit 106.

The first image composition unit 106 generates a composite image A by compositing the images $F[i]$ and $F[i-1]$ at a composite ratio $a$ ($0 \leq a \leq 1$) according to:

$$A[i] = F[i] \times a + F[i-1] \times (1-a) \quad (1)$$

This equation means that an image having, as pixel values, sums of products of pixel values of respective pixels which form the image $F[i]$ by $a$, and those of pixel values of respective pixels which form the image $F[i-1]$ by $(1-a)$, is generated as a composite image $A[i]$. Note that this composite ratio $a$ may be set in advance or may be set as needed by the user using an operation unit or the like (not shown). The first image composition unit 106 outputs the generated composite image $A[i]$ to a low frequency image generation unit 104.

The low frequency image generation unit 104 generates an image including low frequency components in the composite image $A[i]$ as a low frequency component image $LPF(A[i])$. In this embodiment, the low frequency component image $LPF(A[i])$ is generated by applying filter processing using a low-pass filter (LPF) to the composite image $A[i]$. However, the generation method of the low frequency component image $LPF(A[i])$ and the configuration of the low-pass filter are not limited to the specific generation method and specific configuration. Then, the low frequency image generation unit 104 outputs the generated low frequency component image $LPF(A[i])$ to a selection unit 105.

The high frequency image generation unit 103 generates an image by emphasizing high frequency components in the image $F[i]$ (input image) as a high frequency component emphasized image $HPF(F[i])$. A generation method of the high frequency component emphasized image $HPF(F[i])$ is not limited to a specific generation method, but that image can be generated according to:

$$HPF(F[i]) = 2 \times F[i] - LPF(F[i]) \quad (2)$$

This equation means that an image having, as pixel values, differences obtained by subtracting pixel values of respective pixels which form an image obtained by applying low-pass filter processing to the image $F[i]$ from doubled pixel values of respective pixels which form the image $F[i]$ is generated as a high frequency component emphasized image. Then, the high frequency image generation unit 103 outputs the generated high frequency component emphasized image $HPF(F[i])$ to the selection unit 105.

The selection unit 105 sequentially selects and outputs the high frequency component emphasized image $HPF(F[i])$ and low frequency component image $LPF(A[i])$ as sub-frames. The selection unit 105 is desirably switched to select and output the low frequency component image $LPF(A[i])$ as a sub-frame (to be referred to as a first sub-frame hereinafter) which is temporally ahead of the high frequency component emphasized image $HPF(F[i])$.

With the aforementioned operations of the respective units, in the "spatial frequency separation method", high frequency components involved in a motion blur can be locally included in one sub-frame and displayed. Next, a method of compositing images between frames so as to eliminate a tailing phenomenon viewed due to a temporal barycenter shift in display will be described below.

Figure 2:
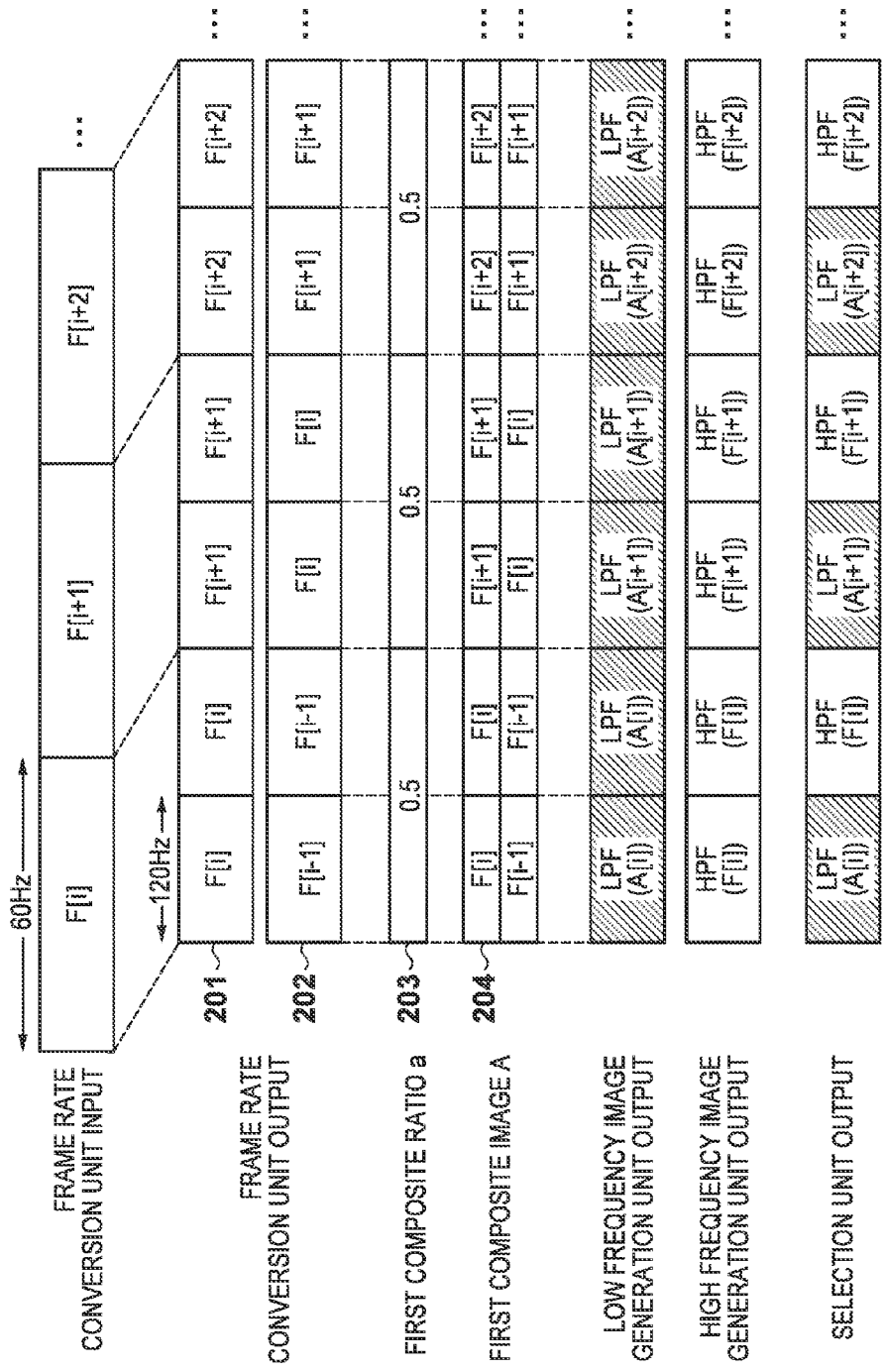
FIG. 2 is a view for explaining an image processing method according to the first embodiment.

FIG. 2 is a view for explaining an image processing method according to the first embodiment. For example, an image input at a frame rate of 60 Hz is converted into a frame rate of 120 Hz twice of the input frame rate, and the frame rate conversion unit 101 outputs the image $F[i]$ (an image 201 in FIG. 2) and the image $F[i-1]$ (an image 202 in FIG. 2). After that, the images $F[i]$ and $F[i-1]$ are composited at a composite ratio a=0.5. Reference numeral 203 in FIG. 2 indicates that the composite ratio a=0.5, and reference numeral 204 denotes a composite image as an average image of the images $F[i]$ and $F[i-1]$.

The low frequency component image $LPF(A[i])$ is generated based on the composite image $A[i]$ as an average image between the images $F[i]$ and $F[i-1]$, and the high frequency component emphasized image $HPF(F[i])$ is generated based on the image $F[i]$. Then, the low frequency component image $LPF(A[i])$ is displayed as a first sub-frame, and the high frequency component emphasized image HPF(F[i]) is displayed as a second sub-frame.

In this embodiment, in order to eliminate a tailing phenomenon, images are composited in advance between frames so as to reduce a temporal barycenter shift, and the low frequency component image is then generated. As shown in FIG. 2, when an input image is divided into two sub-frames to be displayed, the composite ratio a=0.5 is set to generate an average image of the images F[i] and F[i−1] as a composite image, thus satisfactorily reducing the temporal barycenter shift and eliminating an image distortion caused by the tailing phenomenon.

As described above, a motion blur can be suppressed by the "spatial frequency separation method", while a tailing phenomenon viewed as a result of a temporal barycenter shift in display can also be eliminated.

Note that the composite image is not limited to that generated from a frame of interest and a frame immediately before the frame of interest, and it may be generated from the frame of interest and a previous frame older than the frame of interest. The same applies to the following embodiments.

Second Embodiment

The "spatial frequency separation method" in the first embodiment displays different images for respective sub-frames. On the other hand, when the "spatial frequency separation method" is applied to a liquid crystal display device which executes a sub-frame inversion AC drive operation so as to eliminate "burn-in", an applied voltage may be biased to one polarity, and a charge bias applied across electrodes cannot often be canceled.

This embodiment will explain an image processing apparatus and image processing method, which suppress image quality deterioration such as burn-in caused by a charge bias when the "spatial frequency separation method" is applied to a liquid crystal display device which executes a sub-frame inversion AC drive operation.

More specifically, a charge bias is eliminated by displaying a low frequency component image and high frequency component emphasized image while replacing their display order for respective given periods. In this case, the display order is replaced step by step in a plurality of frame periods, a movie distortion at the time of replacement is avoided.

Figure 3:
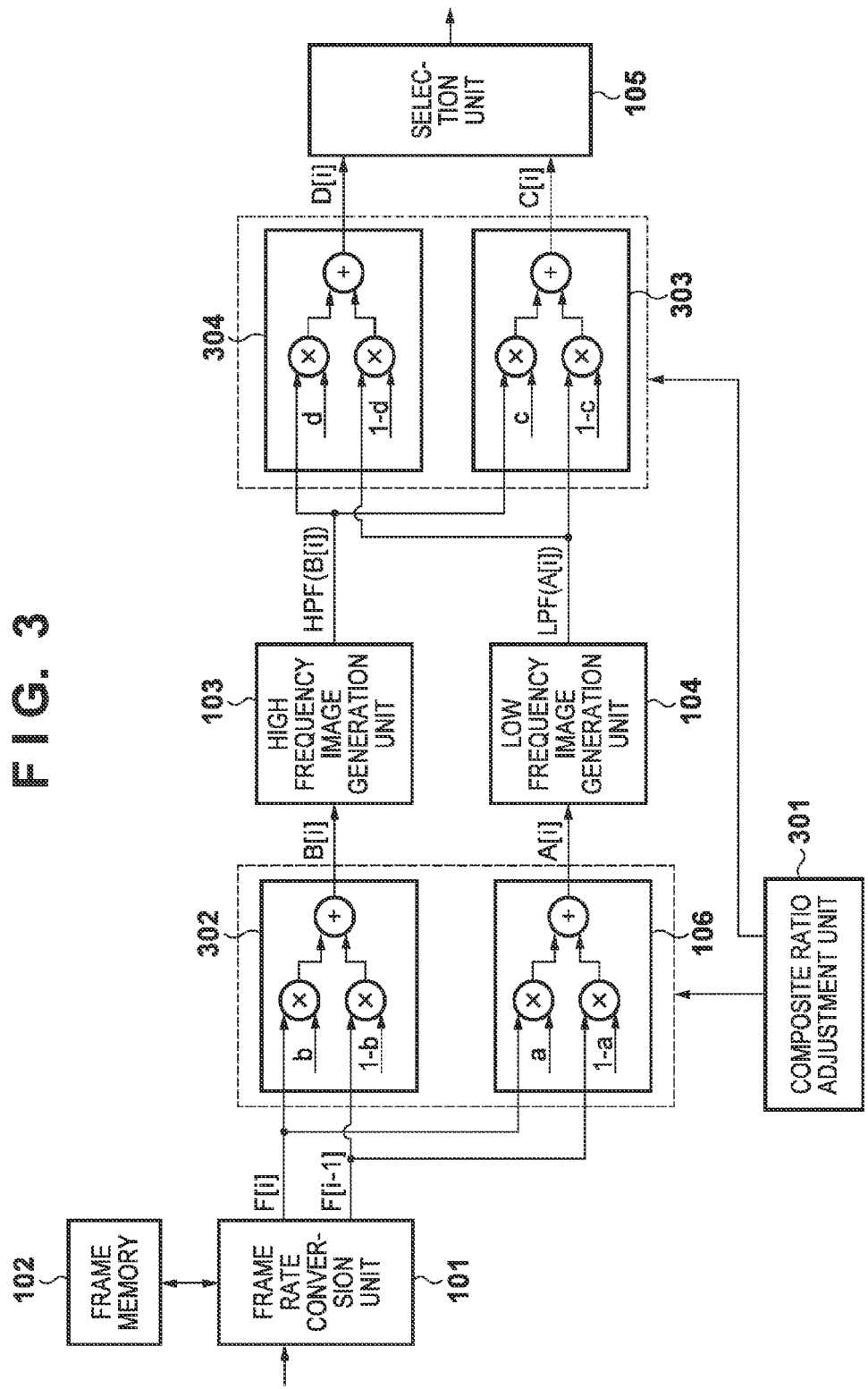
FIG. 3 is a block diagram showing an example of the functional arrangement of an image processing apparatus.

An example of the functional arrangement of an image processing apparatus according to this embodiment will be described below with reference to the block diagram shown in FIG. 3. Note that the same reference numerals in FIG. 3 denote the same functional units as those shown in FIG. 1, and a description thereof will not be repeated.

A second image composition unit 302 generates a composite image B[i] by compositing images F[i] and F[i−1] at a composite ratio b (0≤b≤1) according to:

$$B[i]=F[i]\times b+F[i-1]\times(1-b) \quad (3)$$

This equation means that an image having, as pixel values, sums of products of pixel values of respective pixels which form the image F[i] by b, and those of pixel values of respective pixels which form the image F[i−1] by (1−b), is generated as a composite image B[i]. In this embodiment, a composite ratio a used in a first image composition unit 106 and the composite ratio b used in the second image composition unit 302 are adjusted by a composite ratio adjustment unit 301. Details of the adjustment method will be described later. Then, the second image composition unit 302 outputs the generated composite image B[i] to a high frequency image generation unit 103.

The high frequency image generation unit 103 generates an image by emphasizing high frequency components in the composite image B[i] (input image) as a high frequency component emphasized image HPF(B[i]). A generation method of the high frequency component emphasized image HPF(B[i]) is not limited to a specific generation method, but that image can be generated according to:

$$HPF(B[i])=2\times B[i]-LPF(B[i]) \quad (4)$$

This equation means that an image having, as pixel values, differences obtained by subtracting pixel values of respective pixels which form an image obtained by applying low-pass filter processing to the image B[i] from doubled pixel values of respective pixels which form the image B[i] is generated as a high frequency component emphasized image. Then, the high frequency image generation unit 103 outputs the generated high frequency component emphasized image HPF(B[i]) to a third image composition unit 303 and fourth image composition unit 304. On the other hand, a low frequency image generation unit 104 outputs a generated low frequency component image LPF(A[i]) to the third image composition unit 303 and fourth image composition unit 304.

The third image composition unit 303 generates a composite image C[i] by compositing the high frequency component emphasized image HPF(B[i]) and low frequency component image LPF(A[i]) at a composite ratio c (0≤c≤1) according to:

$$C[i]=HPF(B[i])\times c+LPF(A[i])\times(1-c) \quad (5)$$

This equation means that an image having, as pixel values, sums of products of pixel values of respective pixels which form the image HPF(B[i]) by c, and those of pixel values of respective pixels which form the image LPF(A[i]) by (1−c) is generated as a composite image C[i]. Then, the third image composition unit 303 outputs the generated composite image C[i] to a selection unit 105.

The fourth image composition unit 304 generates a composite image D[i] by compositing the high frequency component emphasized image HPF(B[i]) and low frequency component image LPF(A[i]) at a composite ratio d (0≤d≤1) according to:

$$D[i]=HPF(B[i])\times d+LPF(A[i])\times(1-d) \quad (6)$$

This equation means that an image having, as pixel values, sums of products of pixel values of respective pixels which form the image HPF(B[i]) by d, and those of pixel values of respective pixels which form the image LPF(A[i]) by (1−d) is generated as a composite image D[i]. Then, the fourth image composition unit 304 outputs the generated composite image D[i] to the selection unit 105.

In this embodiment, the composite ratio c used in the third image composition unit 303 and the composite ratio d used in the fourth image composition unit 304 are adjusted by the composite ratio adjustment unit 301. This adjustment method will be described in detail later.

The selection unit 105 sequentially selects and outputs the composite images C[i] and D[i] as sub-frames. The selection unit 105 is desirably switched to select and output the composite image C[i] as a sub-frame (to be referred to as a first sub-frame hereinafter) which is temporally ahead of the composite image D[i].

The composite ratio adjustment unit 301 adjusts the composite ratio a, composite ratio b, composite ratio c, and composite ratio d for respective frames, as described above. A method of replacing a display order of the low frequency component image and high frequency component image by adjusting these composite ratios will be described below with reference to FIGS. 4A and 4B. Display orders in respective frame periods will be described below.

<Frame Period T0>

Figure 4A:
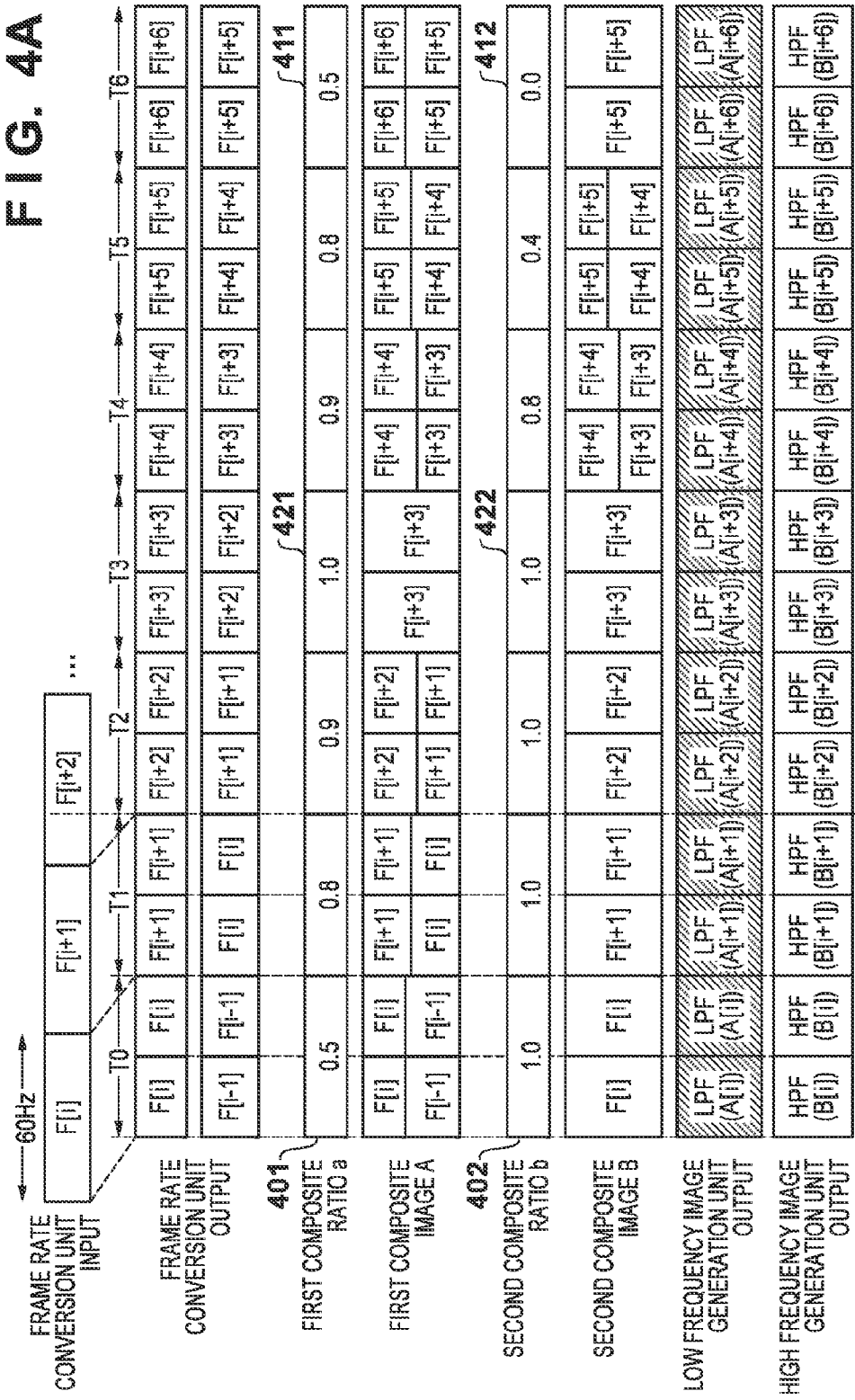
FIGS. 4A and 4B are views each for explaining a method of replacing a display order.
Figure 4B:
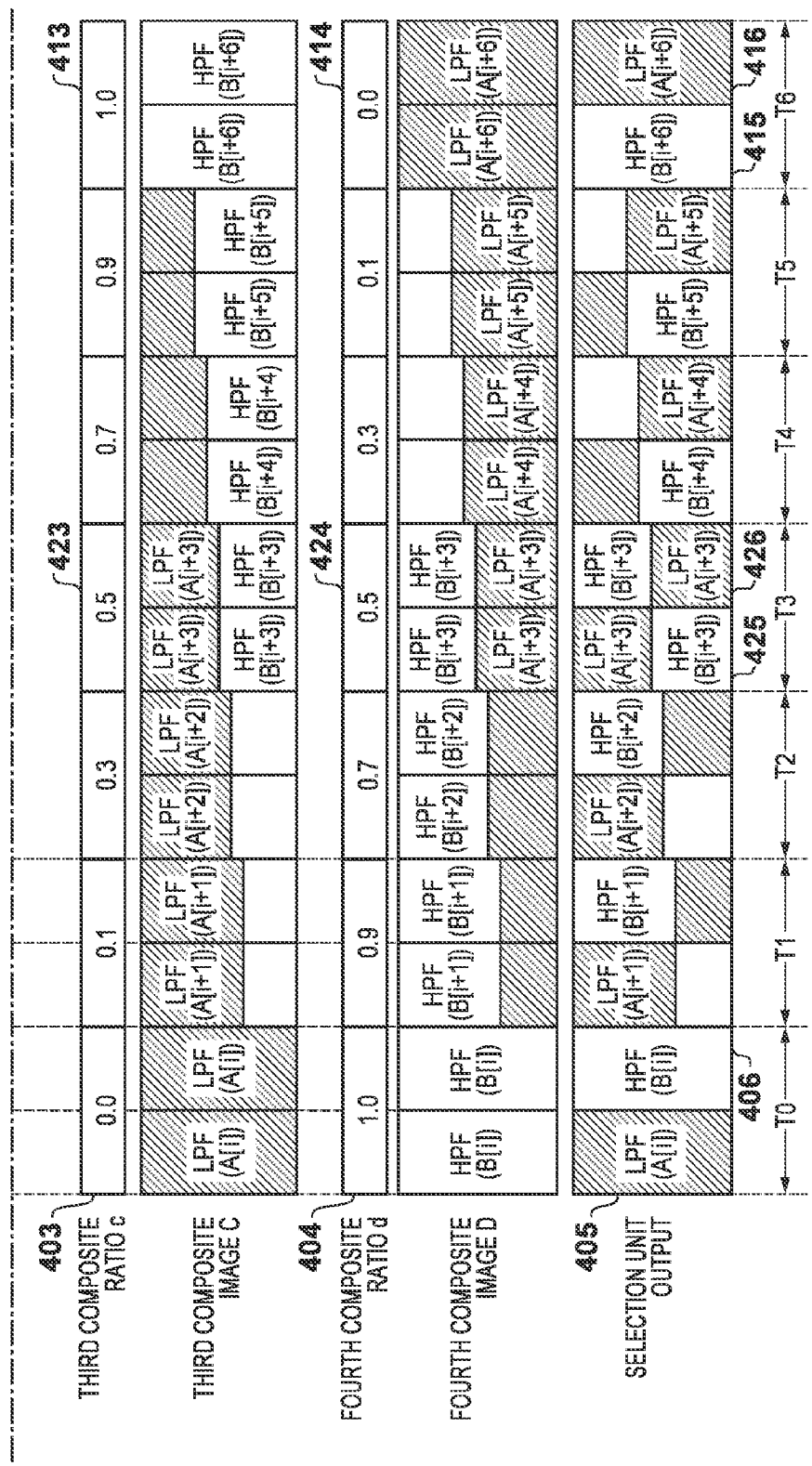

In FIGS. 4A and 4B, attention is focused on a frame period T0 first. In FIGS. 4A and 4B, the composite ratio adjustment unit 301 sets the composite ratio a, composite ratio b, composite ratio c, and composite ratio d in the frame period T0 as follows.

Composite ratio a=0.5 (reference numeral 401)
Composite ratio b=1.0 (reference numeral 402)
Composite ratio c=0.0 (reference numeral 403)
Composite ratio d=1.0 (reference numeral 404)

By setting the respective composite ratios in this way, sub-frame images displayed in the frame period T0 can be expressed as:

First sub-frame(reference numeral 405)=$LPF(A[i])$
=$LPF(F[i] \times 0.5 + F[i-1] \times 0.5)$ Second sub-frame(reference numeral 406)=$HPF(B[i])$
=$HPF(F[i])$ This means that display images of respective sub-frames are the same as those in the first embodiment.

In this manner, in the frame period T0, high frequency components are locally included in the second sub-frame as in the first embodiment, thus obtaining an effect of suppressing a motion blur. Furthermore, the low frequency component image is based on an average image of the images F[i] and F[i−1], and a tailing phenomenon viewed due to a temporal barycenter shift in display can be eliminated.

<Frame Period T6>

Next, in FIGS. 4A and 4B, attention is focused on a frame period T6. In FIGS. 4A and 4B, the composite ratio adjustment unit 301 sets the composite ratio a, composite ratio b, composite ratio c, and composite ratio d in the frame period T6 as follows.

Composite ratio a=0.5 (reference numeral 411)
Composite ratio b=0.0 (reference numeral 412)
Composite ratio c=1.0 (reference numeral 413)
Composite ratio d=0.0 (reference numeral 414)

By setting the respective composite ratios in this way, sub-frame images displayed in the frame period T6 can be expressed as:

First sub-frame(reference numeral 415)=$HPF(B[i+6])$
=$HPF(F[i+5])$

Second sub-frame(reference numeral 416)=$LPF(A[i+6])$=$LPF(F[i+6] \times 0.5 + F[i+5] \times 0.5)$ In the frame period T6, high frequency components in the image F[i+5] are locally included in the first frame, and a low frequency component image to be displayed on the second sub-frame is based on an average image of images F[i+6] and F[i+5]. That is, since high frequency components are locally included in the first sub-frame, a motion blur can be suppressed, and a tailing phenomenon viewed due to a temporal barycenter shift in display can be eliminated.

However, in the frame period T6, the display order of a high frequency component emphasized image and low frequency component image to be displayed on the respective sub-frames is opposite to that in the frame period T0. By displaying images by switching the composite ratios in the frame period T0 and those in the frame period T6 for predetermined time periods, a phenomenon that an applied voltage is kept biased to one polarity upon execution of a sub-frame inversion AC driving operation can be suppressed. For example, when the first sub-frame is driven at a plus polarity, and the second sub-frame is driven at a minus polarity, the high frequency component emphasized image is displayed at the minus polarity in the frame period T0, and is displayed at the plus polarity in the frame period T6. In this manner, by switching and displaying the display polarities of respective frequency component images, a bias of an applied voltage can be suppressed.

On the other hand, if the frame periods T0 and T6 are switched in continuous frames, for example, when a movie such as a scroll image is displayed, discontinuity of the movie may be viewed as a movie distortion. In this case, for example, when the switching timing is set in synchronism with a still image display timing or scene change timing, a visual degree of a movie distortion can be suppressed. However, in this embodiment, a method of suppressing a movie distortion caused by discontinuity of a move at the switching timing even during continuous movie display periods will be described below. More specifically, images corresponding to a case in which the "spatial frequency separation method" is not executed are displayed in a frame period T3 located between the frame periods T0 and T6. Then, frames located between neighboring frame periods T0, T3, and T6 are controlled to switch images step by step.

<Frame Period T3>

Next, in FIGS. 4A and 4B, attention is focused on the frame period T3. In FIGS. 4A and 4B, the composite ratio adjustment unit 301 sets the composite ratio a, composite ratio b, composite ratio c, and composite ratio d in the frame period T3 as follows.

Composite ratio a=1.0 (reference numeral 421)
Composite ratio b=1.0 (reference numeral 422)
Composite ratio c=0.5 (reference numeral 423)
Composite ratio d=0.5 (reference numeral 424)

At this time, A[i+3]=F[i+3] and B[i+3]=F[i+3], and A[i+3] and B[i+3] are the same images. Also, sub-frame images displayed in the frame period T3 can be expressed as:

First sub-frame(reference numeral 425)=$LPF(A[i+3]) \times 0.5 + HPF(B[i+3]) \times 0.5$ Second sub-frame(reference numeral 426)=$HPF(B[i+3]) \times 0.5 + LPF(A[i+3]) \times 0.5$ In this case, since A[i+3]=F[i+3] and B[i+3]=F[i+3], display images of the first and second sub-frames are the same images, as described by:

First sub-frame(reference numeral 425)=second sub-frame(reference numeral 426)=$HPF(F[i+3]) \times 0.5 + LPF(F[i+3]) \times 0.5$ Also, based on equation (4), both the display images of the first and second sub-frames can be expressed by F[i+3], and are equivalent to an input frame. That is, the display images in the frame period T3 are the same as those displayed when the "spatial frequency separation method" is not executed.

<Frame Periods T1, T2, T4, and T5>

In frame periods T1 and T2, composite ratios which interpolate those in the frame periods T0 and T3 (to change continuously) are set. For example, the composite ratio a in the frame period T1 is set to be "0.8" and that in the frame period T2 is set to be "0.9", so as to be gradually increased for respective frames.

Also, in frame periods T4 and T5, composite ratios which interpolate those in the frame periods T3 and T6 (to change continuously) are set. For example, the composite ratio a in the frame period T4 is set to be "0.9" and that in the frame period T5 is set to be "0.8", so as to be gradually decreased for respective frames. Also, the composite ratio b in the frame period T4 is set to be "0.8" and that in the frame period T5 is set to be "0.4", so as to be gradually decreased for respective frames.

The composite ratios c and d are also similarly set. That is, in the frame periods T1 to T3 and T3 to T6, the composite ratio c is set to be gradually increased, and the composite ratio d is set to be gradually decreased.

Note that the number of frames in FIGS. 4A and 4B is seven for the sake of descriptive convenience. However, the present invention is not limited to this. Assuming that a frame group including N (N is an integer not less than 2) continuous frames is defined as a first frame group, the composite ratio $\underline{a}$ is set to be gradually increased in the first frame group. Also, assuming that a frame group including N continuous frames after the first frame group is defined as a second frame group, the composite ratios $\underline{a}$ and b are set to be gradually decreased in the second frame group. Between the first and second frame groups, the composite ratio c is set to be gradually increased, and the composite ratio d is set to be gradually decreased.

After step-by-step replacements from the frame period T0 to the frame period T6 are complete, and a predetermined time period has elapsed, those from the frame period T6 to the frame period T0 are similarly executed. Assuming that the first and second frame groups correspond to a period of 30th to 1800th frames (0.5 sec to 30 sec) with respect to an image input of a frame rate of 60 Hz, it is confirmed that discontinuity of a movie at the switching timing is difficult to be observed. As shown in the frame period T3 in FIGS. 4A and 4B, it is desirable to display images equivalent to those displayed when the "spatial frequency separation method" is not executed in the middle of the replacement sequence. Also, the composite ratio $\underline{a}$ is set to be gradually decreased in the first frame group, so as to display images equivalent to those when the "spatial frequency separation method" is executed during the frame period T3, and is set to be gradually increased, thus obtaining the same effects.

The respective image composition units, high frequency image generation unit, and low frequency image generation unit desirably execute various kinds of arithmetic processing on a space which has linear characteristics with respect to luminance characteristics on a display in consideration of gamma characteristics of the display.

As described above, since the composite ratios are set step by step among a plurality of frames to attain a target display order after replacement upon replacing the display order for respective sub-frames, a movie distortion caused by discontinuity of a movie at the switching timing can be suppressed.

The operation of the image processing apparatus according to this embodiment will be described below with reference to the flowchart shown in FIG. 5. In step S1, a control unit (not shown) of the image processing apparatus resets a value of a counter m to zero.

In step S2, the control unit operates to output a low frequency component image as a first sub-frame and a high frequency component emphasized image as a second sub-frame via the aforementioned processes. Such operation mode will be referred to as a drive mode 1 hereinafter. This drive mode 1 is a mode for displaying images in the frame period T0 in FIGS. 4A and 4B. Every time the process of step S2 is executed, the control unit increments the counter m by 1.

The control unit judges in step S3 whether or not the value of the counter m has reached a prescribed value. As a result of this judgment, if the value of the counter m has reached the prescribed value, the control unit judges that the replacement sequence of a display order is started, and the process advances to step S4. On the other hand, if the value of the counter m has not reached the prescribed value yet, the process returns to step S2.

In step S4, the composite ratio adjustment unit 301 processes to gradually increase or decrease the respective composite ratios step by step up to intermediate target values as described above. The intermediate target values are values of the respective composite ratios in the frame period T3 in FIGS. 4A and 4B, and correspond to the composite ratios required to obtain images equivalent to those when the "spatial frequency separation method" is not executed.

Next, in step S5, the composite ratio adjustment unit 301 processes to gradually increase or decrease the respective composite ratios step by step so as to be equal to contents to be displayed in a drive mode 2. The drive mode 2 is a mode required to display images in, for example, the frame period T6 in FIGS. 4A and 4B. In this mode, a first sub-frame displays a high frequency component emphasized image, and a second sub-frame displays a low frequency component image.

Note that parallel to the processing for changing the composite ratios in steps S4 and S5, processing for generating and outputting first and second sub-frames according to the composite ratios is executed. After completion of the processing for gradually increasing or decreasing the composite ratios step by step, the control unit resets the value of the counter m to zero in step S6.

In step S7, the control unit operates to output a high frequency component emphasized image as a first sub-frame and a low frequency component image as a second sub-frame via the aforementioned processes. Such operation mode will be referred to as the second drive mode 2 hereinafter. Every time the process of step S7 is executed, the control unit increments the counter m by 1.

The control unit judges in step S8 whether or not the value of the counter m has reached a prescribed value. As a result of this judgment, if the value of the counter m has reached the prescribed value, the control unit judges that the replacement sequence of a display order is started, and the process advances to step S9. On the other hand, if the value of the counter m has not reached the prescribed value yet, the process returns to step S7.

In step S9, the composite ratio adjustment unit 301 processes to gradually increase or decrease the respective composite ratios step by step so as to be equal to contents to be displayed in the drive mode 1. Note that parallel to the processing for changing the composite ratios in step S9, processing for generating and outputting first and second sub-frames according to the composite ratios is executed.

As described above, according to this embodiment, a motion blur is suppressed by the "spatial frequency separation method", while a tailing phenomenon viewed due to a temporal barycenter shift in display can be eliminated. Furthermore, by replacing a display order of sub-frames upon application of the "spatial frequency separation method" to a liquid crystal display device which performs a sub-frame inversion AC driving operation, image quality deterioration such as burn-in caused by a charge bias can be suppressed. Since images to be displayed are replaced step by step among a plurality of frames to attain a target display order after replacement upon replacing the display order, a movie distortion caused by discontinuity of a movie can be suppressed.

Note that various modifications of the arrangement described as the second embodiment can be made, but they are merely examples of the following arrangement. That is, each frame image is acquired as an input image, and a first composite image obtained by compositing the input image and a previous input image as an input image of a previous frame before the input image at a first composite ratio, and a second composite image obtained by compositing them at a second composite ratio are generated (first composition). Then, an image obtained by emphasizing high frequency components in the first composite image is generated as a high frequency component emphasized image (first generation), and an image including low frequency components in the second composite image is generated as a low frequency component image (second generation).

Then, a third composite image obtained by compositing the high frequency component emphasized image and low frequency component image at a third composite ratio, and a fourth composite image obtained by compositing these images at a fourth composite ratio are generated (second composition), and the third and fourth composite images are alternately output as sub-frame images of the input image. In this case, the first to fourth composite ratios are adjusted for respective frames.

In this adjustment, the first composite ratio is adjusted to composite the input image and previous input image at the same ratio in two end frames of a period of a plurality of continuous frames, and is adjusted so that the input image equals the first composite image in a central frame of the period. In frames between the two end frames and the central frame, the first composite ratio is adjusted to composite ratios obtained by interpolating between the first composite ratio in the two end frames and that in the central frame.

The second composite ratio is adjusted so that the input image equals the second composite image from the beginning of the period until an intermediate frame, and is adjusted so that the previous input image is composited as the second composite image in an end frame of the period. In frames between the intermediate frame and end frame, the second composite ratio is adjusted to composite ratios obtained by interpolating between the second composite ratio in the intermediate frame and that in the end frame.

The third composite ratio is adjusted so that the low frequency component image equals the third composite image in a start frame of the period, and is adjusted so that the high frequency component emphasized image equals the third composite image in the end frame of the period. In frames between the start frame and end frame, the third composite ratio is adjusted to composite ratios obtained by interpolating between the third composite ratio in the start frame and that in the end frame.

The fourth composite ratio is adjusted so that the high frequency component emphasized image equals the fourth composite image in a start frame of the period, and is adjusted so that the low frequency component image equals the fourth composite image in the end frame of the period. In frames between the start frame and end frame, the fourth composite ratio is adjusted to composite ratios obtained by interpolating between the fourth composite ratio in the start frame and that in the end frame.

Third Embodiment

Figure 6:
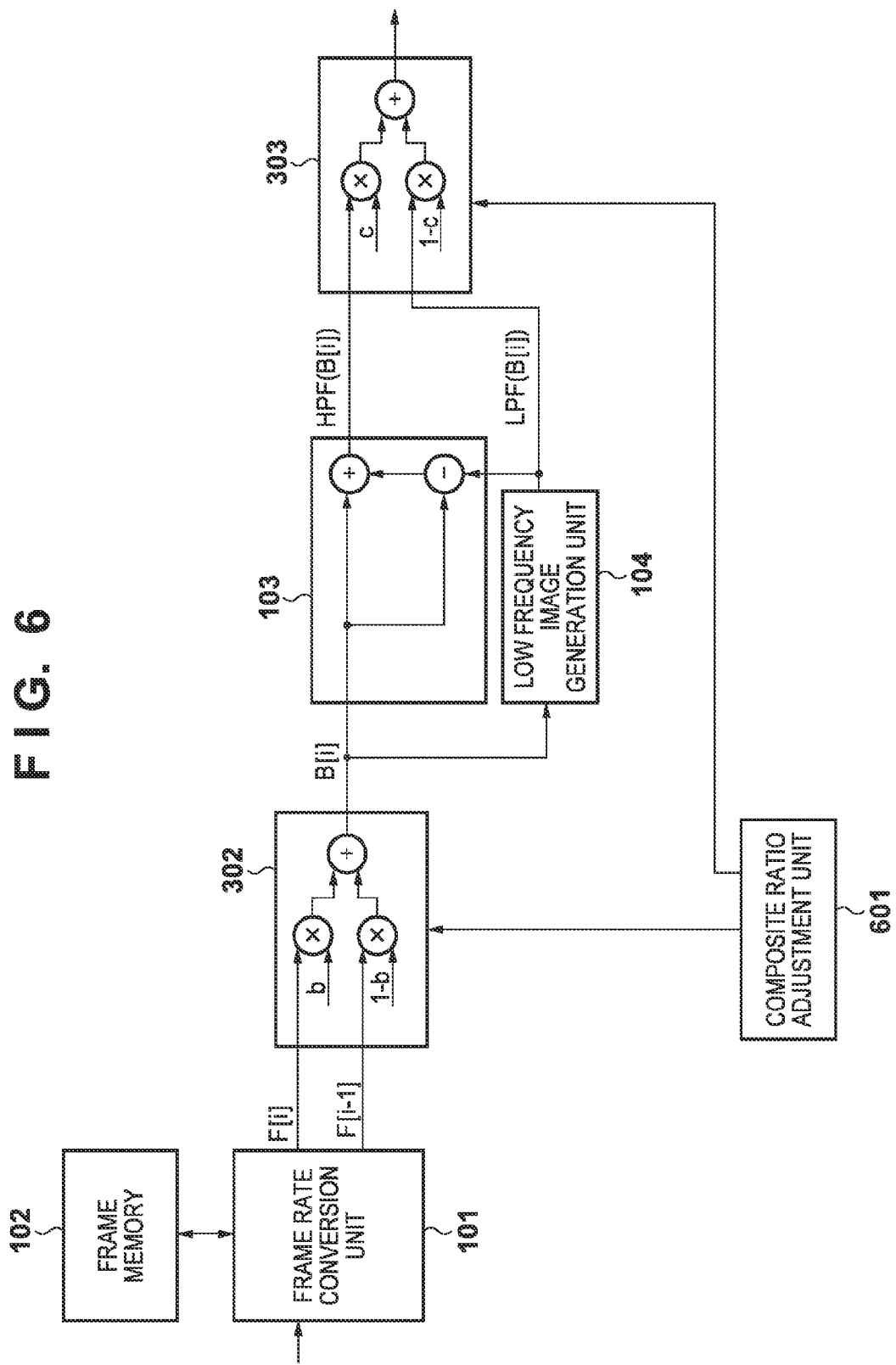
FIG. 6 is a block diagram showing an example of the functional arrangement of an image processing apparatus.

The second embodiment is an example of an embodiment in which respective composite ratios are switched for respective frames. This embodiment will explain an example in which composite ratios are switched for respective sub-frames. An example of the functional arrangement of an image processing apparatus according to this embodiment will be described first with reference to the block diagram shown in FIG. 6. Note that the same reference numerals in FIG. 6 denote the same functional units as those shown in FIGS. 1 and 3, and a description thereof will not be repeated.

A second image composition unit 302 generates a composite image B[i] using a composite ratio b designated by a composite ratio adjustment unit 601 in the same manner as in the second embodiment. Then, the second image composition unit 302 outputs the generated composite image B[i] to a high frequency image generation unit 103 and low frequency image generation unit 104.

The high frequency image generation unit 103 generates a high frequency component emphasized image HPF(B[i]) in the same manner as in the second embodiment, and outputs the generated high frequency component emphasized image HPF(B[i]) to a third image composition unit 303.

The low frequency image generation unit 104 generates an image including low frequency components of the composite image B[i] as a low frequency component image LPF(B[i]). The generation method is as described in the first embodiment. Then, the low frequency image generation unit 104 outputs the generated low frequency component image LPF(B[i]) to the third image composition unit 303.

The third image composition unit 303 generates a composite image C[i] from the high frequency component emphasized image HPF(B[i]) and low frequency component image LPF(B[i]) using a composite ratio c designated by the composite ratio adjustment unit 601 in the same manner as in the second embodiment.

Adjustment of the composite ratios b and c by the composite ratio adjustment unit 601 will be described below with reference to FIG. 7. The composite ratio adjustment unit 601 sets the composite ratios b and c for respective sub-frames, as described above.

For example, the composite ratio b is set to be gradually decreased from 0.5 in a first sub-frame (for the first sub-frame) in a first frame group (frame periods T0 to T3 in FIG. 7), and is left unchanged from 1.0 in a second sub-frame (for the second sub-frame). Also, the composite ratio b is left unchanged from 0.0 in a first sub-frame (for the first sub-frame) in a second frame group (frame periods T4 to T6 in FIG. 7), and is set to be gradually decrease from 1.0 in a second sub-frame (for the second sub-frame).

That is, as for the first sub-frame, a composite ratio for the previous frame of the two frames to be composited is gradually increased during the period of the first frame group, and the previous frame of the two frames is adopted during the period of the second frame group. As for the second sub-frame, the latest frame of the two frames is adopted during the period of the first frame group, and the composite ratio for the previous frame is gradually increased during the period of the second frame group.

Also, for example, the composite ratio c is set to be gradually increased from 0.0 in a first sub-frame, and is set to be gradually decreased from 1.0 in a second sub-frame in the first and second frame groups.

That is, during the period of the first and second frame groups, the composite ratio for the low frequency component image LPF is gradually decreased for the first sub-frame, and that for the high frequency component emphasized image HPF is gradually decreased for the second sub-frame.

Figure 7:
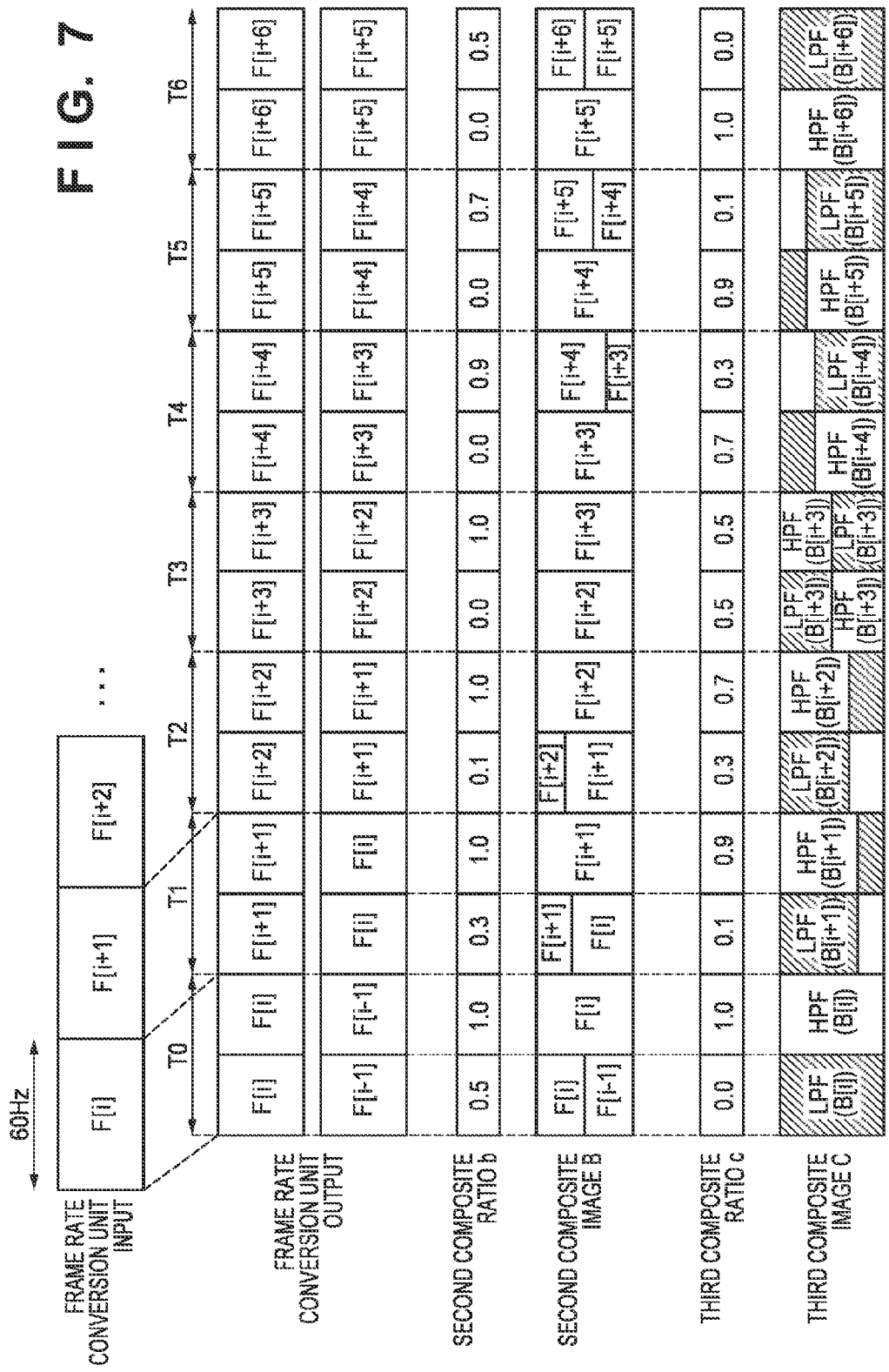
FIG. 7 is a view for explaining adjustment of composite ratios b and c.

Both the composite ratios are set for respective sub-frames so as to attain a target display order after replacement, and to display images equivalent to those when the "spatial frequency separation method" is not executed in an intermediate frame (period T3 in FIG. 7). Thus, the display order can be replaced step by step.

As described above, according to this embodiment, a motion blur is suppressed by the "spatial frequency separation method", while a tailing phenomenon viewed due to a temporal barycenter shift in display can be eliminated as in the second embodiment. Furthermore, by replacing a display order of sub-frames upon application of the "spatial frequency separation method" to a liquid crystal display device which performs a sub-frame inversion AC driving operation, image quality deterioration such as burn-in caused by a charge bias can be suppressed. Since images to be displayed are replaced step by step among a plurality of frames to attain a target display order after replacement upon replacing the display order, a movie distortion caused by discontinuity of a movie can be suppressed. Furthermore, since the composite ratios of images are switched and set for respective sub-frames, the total number of image composition units to be implemented can be reduced compared to the second embodiment.

Note that various modifications of the arrangement described as the third embodiment can be made, but they are merely examples of the following arrangement. That is, each frame image is acquired as an input image, a plurality of sub-frame images with respect to the input image are generated, and the sub-frame images are output. The sub-frames are generated as follows.

Initially, a first composite image is generated by compositing the input image and a previous input image as an input image of a previous frame before the input image at a first composite ratio adjusted for a sub-frame of interest (first composition). An image obtained by emphasizing high frequency components in the first composite image is generated as a high frequency component emphasized image (first generation), and an image including low frequency components in the first composite image is generated as a low frequency component image (second generation).

Then, a second composite image obtained by compositing the high frequency component emphasized image and low frequency component image at a second composite ratio adjusted for the sub-frame of interest is generated as an image of the sub-frame of interest (second composition), and the first and second composite ratios are adjusted for respective sub-frames.

Fourth Embodiment

In the first to third embodiments, in order to suppress a temporal barycenter shift in display by the "spatial frequency separation method", a low frequency component image is generated using a composite image of two continuous frames. This embodiment is an example of an embodiment suited to a case in which a low frequency component image is generated using an interpolation image as an image between two continuous frames so as to suppress a temporal barycenter shift in display by the "spatial frequency separation method".

Figure 8:
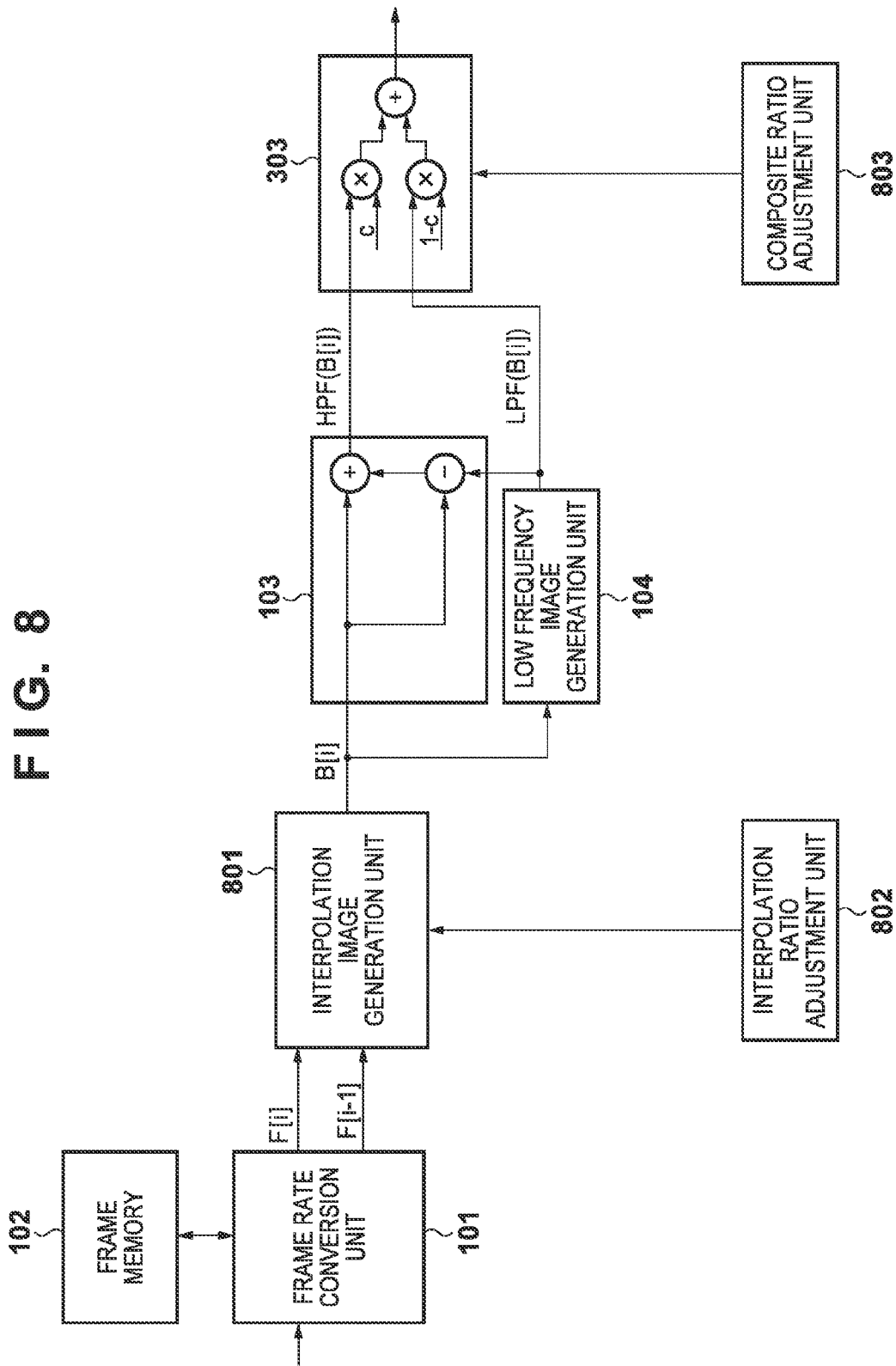
FIG. 8 is a block diagram showing an example of the functional arrangement of an image processing apparatus.

An example of the functional arrangement of an image processing apparatus according to this embodiment will be described below with reference to the block diagram shown in FIG. 8. Note that the same reference numerals in FIG. 8 denote the same functional units as those shown in FIGS. 1 and 3, and a description thereof will not be repeated.

Upon reception of images F[i] and F[i−1] read out from a frame memory 102 at a double frame rate from a frame rate conversion unit 101, an interpolation image generation unit 801 generates an interpolation image as an image between these two frames. The interpolation image is estimated by detecting motion vectors of objects in an image.

An example of the interpolation image generation method will be described below. A reference image F[i] is divided into a plurality of pixel blocks. Then, a pixel block in the image F[i], which block has a highest correlation with each of pixel blocks in an image F[i−1], is calculated, and a motion vector is estimated. The processing for calculating a block having a high correlation can use, for example, a block matching algorithm. According to the estimated motion vector, an interpolation image is generated and output so that the block moves to an intermediate position between frames.

For example, a low frequency component image is displayed as a first sub-frame, and a high frequency component emphasized image is displayed as a second sub-frame. In this case, the interpolation image generation unit 801 generates an interpolation image from the images F[i] and F[i−1] and outputs it as the first sub-frame, and outputs the image F[i] intact as the second sub-frame. Conversely, a high frequency component emphasized image is displayed as a first sub-frame, and a low frequency component image is displayed as a second sub-frame. In this case, the interpolation image generation unit 801 outputs the image F[i−1] intact as the first sub-frame, and generates an interpolation image from the images F[i−1] and F[i] and outputs it as the second sub-frame.

In this case, if a motion vector amount is expressed by an interpolation ratio v ($0 \leq v \leq 1$) generated by an interpolation ratio adjustment unit 802, when an interpolation image is generated at, for example, an intermediate position (a frame position to be interpolated) between frames, it can be expressed by the interpolation ratio v=0.5. On the other hand, when a display order is replaced step by step for sub-frames, the interpolation ratio v can be gradually increased or decreased for respective sub-frames as in the above embodiments.

For example, when the interpolation ratio v=0 in the image F[i], an interpolation image corresponds to the image F[i−1]; when the interpolation ratio v=1 in this case, an interpolation image corresponds to the image F[i]. Also, assuming that an interpolation image corresponding to an intermediate position between the images F[i] and F[i−1] is generated when the interpolation ratio v=0.5, since a composite ratio b in FIG. 7 is applied intact as the interpolation ratio v, a display order can be replaced step by step for sub-frames. At this time, as for a composite ratio c to be set by the interpolation ratio adjustment unit 802, a composite ratio c in FIG. 7 can be applied intact.

As described above, according to this embodiment, even when a low frequency component image is generated using an interpolation image between frames so as to suppress a temporal barycenter shift in display by the "spatial frequency separation method", a display order can be replaced step by step.

Since an interpolation image is generated to correspond to an intermediate position between frames by estimating a motion vector, a low frequency component image (an image including low frequency components in the interpolation image) is generated, thus suppressing a temporal barycenter shift. On the other hand, since the interpolation image is based on the estimation result of a motion vector, an image is not always generated at an ideal intermediate position, but a generation error can be compensated for by displaying the low frequency component image in a so-called blurred state.

Fifth Embodiment

The embodiments described so far have explained the case in which the frame rate conversion unit 101 decomposes each input frame image into two sub-frame images, and outputs two sub-frame images in one frame period. However, the present invention is not limited to this. That is, M (M≥2) sub-frame images need only be output one frame period. For example, even when each frame image is decomposed into four sub-frame images to be output, a display order need only be replaced to replace a polarity for driving a high frequency component emphasized image. In this case, respective composite ratios and interpolation ratios of sub-frames need only be set to be gradually increased or decreased step by step to have a display image after replacement as a target image. Furthermore, the value range (0 to 1) of each composite ratio described above is not limited to this. For example, a value not less than 1 may be set. Furthermore, the present invention is applicable not only to the "spatial frequency separation method" but also in a case in which different images are displayed on respective sub-frames by sub-frame inversion AC driving operations.

The respective units shown in FIGS. 1, 3, 6, and 8 may be implemented by hardware. Alternatively, the respective units other than the frame memory 102 may be implemented by software (computer program). For example, this computer program is installed in a hard disk included in a general PC (Personal Computer), and respective frame images are stored in this hard disk. Then, when a CPU of this PC reads out this computer program from the hard disk onto a RAM, and executes the readout program, this PC functions as the image processing apparatus of each of the above embodiments. Also, the first to fourth embodiments may be combined as needed, and only some or all of techniques may be combined.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-144587 filed Jun. 27, 2012 which is hereby incorporated by reference herein in its entirety.

What is claimed is:
1. An image processing apparatus comprising:
an acquisition unit configured to acquire an image;
a first composition unit configured to generate a first composite image by compositing the acquired image and a previous image which is acquired before the acquired image at a first composition ratio and to generate a second composite image by compositing the acquired image and the previous image at a second composite ratio;
a first generation unit configured to generate an image obtained by emphasizing high frequency components in the first composite image as a high frequency component emphasized image;
a second generation unit configured to generate an image which has reduced high frequency components in the second composite image as a low frequency component image;
a second composition unit configured to generate a third composite image by compositing the high frequency component emphasized image and the low frequency component image at a third composite ratio and to generate a fourth composite image by compositing the high frequency component emphasized image and the low frequency component image at a fourth composite ratio;
an output unit configured to alternately output the third composite image and the fourth composite image as sub-frame images of the acquired image; and
a composite ratio adjustment unit configured to adjust the first composite ratio, the second composite ratio, the third composite ratio, and the fourth composite ratio for respective frames.

2. The apparatus according to claim 1,
wherein the composite ratio adjustment unit adjusts the first composite ratio so that the acquired image and the previous image are composited at a corresponding ratio in a start image and an end image of a plurality of continuous images corresponding to a predetermined period;
adjusts the first composite ratio so that a ratio of the acquired image for the first composite image in a central image of the plurality of continuous images is higher than a predetermined ratio; and
adjusts the first composite ratio for images between the start image and the central image and between the central image and the end image by interpolating between the first composite ratio in the start and end images and the first composite ratio in the central image.

3. The apparatus according to claim 2,
wherein the composite ratio adjustment unit adjusts the second composite ratio so that a ratio of the acquired image for the second composite image from the start image until an intermediate image of the plurality of continuous images is higher than the predetermined ratio;
adjusts the second composite ratio so that a ratio of the previous image for the second composite image in the end image is higher than the predetermined ratio; and
adjusts the second composite ratio to composite ratios obtained by interpolating between the second composite ratio in the intermediate image and the second composite ratio in the end image in images between the intermediate image and the end image.

4. The apparatus according to claim 3,
wherein the composite ratio adjustment unit adjusts the third composite ratio so that a ratio of the low frequency component image for the third composite image in the start image is higher than the predetermined ratio;
adjusts the third composite ratio so that a ratio of the high frequency component emphasized image for the third composite image in the end image is higher than the predetermined ratio; and
adjusts the third composite ratio to composite ratios obtained by interpolating between the third composite ratio in the start image and the third composite ratio in the end image in images between the start image and the end image.

5. The apparatus according to claim 4,
wherein the composite ratio adjustment unit adjusts the fourth composite ratio so that a ratio of the high frequency component emphasized image for the fourth composite image in the start image is higher than the predetermined ratio;
adjusts the fourth composite ratio so that a ratio of the low frequency component image for the fourth composite image in the end image is higher than the predetermined ratio; and adjusts the fourth composite ratio for images between the start and end images by interpolating between the fourth composite ratio in the start image and the fourth composite ratio in the end image.

6. The apparatus according to claim 2,
wherein the composite ratio adjustment unit adjusts the first composite ratio so that the acquired image equals the first composite image in the central image of the plurality of continuous images.

7. The apparatus according to claim 1,
wherein the composite ratio adjustment unit adjusts the first, second, third, and fourth composite ratios so that a display order of an image whose ratio of the high frequency component emphasized image is higher than the low frequency component image and an image whose ratio of the low frequency component image is higher than the high frequency component emphasized image is switched for a predetermined number of images.

8. An image processing apparatus comprising:
an acquisition unit configured to acquire an image;
a generation unit configured to generate images as sub-frames with respect to the acquired image; and
an output unit configured to output the sub-frame;
wherein the generation unit comprises:
a first composition unit configured to generate a first composite image by compositing the acquired image and a previous image which is acquired before the acquired image at a first composite ratio;
a first generation unit configured to generate an image obtained by emphasizing high frequency components in the first composite image as a high frequency component emphasized image;
a second generation unit configured to generate an image which has reduced high frequency components in the first composite image as a low frequency component image;
a second composition unit configured to generate, as the sub-frame, a second composite image by compositing the high frequency component emphasized image and the low frequency component image at a second composite ratio; and
a composite ratio adjustment unit configured to adjust the first composite ratio and the second composite ratio for each sub-frame.

9. The apparatus according to claim 8,
wherein when the generation unit generates a first sub-frame and a second sub-frame with respect to the acquired image, the composite ratio adjustment unit adjusts the first composite ratio for the first sub-frame so as to composite the acquired image and the previous image at a corresponding ratio in start and end images of a plurality of continuous images corresponding to a predetermined period;
adjusts the first composite ratio for the first sub-frame so that a ratio of the previous image for the first composite image in a central image of the plurality of continuous images is higher than a predetermined ratio; and
adjusts the first composite ratio for the first sub-frame in images between the start image and the central image and between the central image and the end image by interpolating between the first composite ratio in the start and end images and the first composite ratio in the central image, and
the composite ratio adjustment unit adjusts the first composite ratio for the second sub-frame so that a ratio of the acquired image for the first composite image from the start image until an intermediate image of the plurality of continuous images is higher than the predetermined ratio;
adjusts the first composite ratio for the second sub-frame so as to composite the acquired image and the previous image at the corresponding ratio in the end image; and
adjusts the first composite ratio for the second sub-frame in images between the intermediate image and the end image by interpolating between the first composite ratio in the intermediate frame and the first composite ratio in the end frame.

10. The apparatus according to claim 9,
wherein the composite ratio adjustment unit adjusts the second composite ratio for the first sub-frame so that a ratio of the low frequency component image for the second composite image in the start image is higher than the predetermined ratio;
adjusts the second composite ratio for the first sub-frame so that a ratio of the high frequency component emphasized image for the second composite image in the end image is higher than the predetermined ratio; and
adjusts the second composite ratio for the first sub-frame in images between the start and end images by interpolating between the second composite ratio in the start image and the second composite ratio in the end image; and
the composite ratio adjustment unit adjusts the second composite ratio for the second sub-frame so that a ratio of the high frequency component emphasized image for the second composite image in the start image is higher than the predetermined ratio;
adjusts the second composite ratio for the second sub-frame so that a ratio of the low frequency component image for the second composite image in the end image is higher than the predetermined ratio; and
adjusts the second composite ratio for the second sub-frame in images between the start and end images by interpolating between the second composite ratio in the start image and the second composite ratio in the end image.

11. The apparatus according to claim 9,
wherein the composite ratio adjustment unit adjusts the first composite ratio for the first sub-frame so that the previous image equals the first composite image in the central image of the plurality of continuous images, and
the composite ratio adjustment unit adjusts the first composite ratio for the second sub-frame so that the acquired image equals the first composite image from the start image until an intermediate image of the plurality of continuous images.

12. An image processing method executed by an image processing apparatus, comprising:
acquiring an image;
generating a first composite image by compositing the acquired image and a previous image which is acquired before the acquired image at a first composition ratio, and generating a second composite image by compositing the acquired image and the previous image at a second composite ratio;
generating an image obtained by emphasizing high frequency components in the first composite image as a high frequency component emphasized image;
generating an image which has reduced high frequency components in the second composite image as a low frequency component image;
generating a third composite image by compositing the high frequency component emphasized image and the low frequency component image at a third composite ratio, and generating a fourth composite image by compositing the high frequency component emphasized image and the low frequency component image at a fourth composite ratio;

alternately outputting the third composite image and the fourth composite image as sub-frame images of the acquired image; and adjusting the first composite ratio, the second composite ratio, the third composite ratio, and the fourth composite ratio for respective frames.

13. An image processing method executed by an image processing apparatus, comprising:

acquiring an image;

generating images as sub-frames with respect to the acquired image; and outputting the sub-frame;

wherein the generating comprises:

generating a first composite image by compositing the acquired image and a previous image which is acquired before the acquired image at a first composite ratio;

generating an image obtained by emphasizing high frequency components in the first composite image as a high frequency component emphasized image;

generating an image which has reduced high frequency components in the first composite image as a low frequency component image;

generating, as the sub-frame, a second composite image by compositing the high frequency component emphasized image and the low frequency component image at a second composite ratio; and adjusting the first composite ratio and the second composite ratio for each sub-frame.

* * * * *